United States Patent [19]

Normet

[11] Patent Number: 5,369,541
[45] Date of Patent: Nov. 29, 1994

[54] THREE-PHASE UNBALANCE AND VOLTAGE MONITOR CIRCUIT

[75] Inventor: Henno Normet, Tavares, Fla.

[73] Assignee: Diversified Electronics, Inc., Evansville, Ind.

[21] Appl. No.: 928,785

[22] Filed: Aug. 13, 1992

[51] Int. Cl.$^5$ ............................................. H02H 3/24
[52] U.S. Cl. ............................................. 361/85; 361/92
[58] Field of Search .................. 363/54; 361/85, 92, 361/86, 84, 88

[56]  References Cited

U.S. PATENT DOCUMENTS

| | | | |
|---|---|---|---|
| 4,021,703 | 5/1977 | Gary et al. | 361/85 |
| 4,218,728 | 8/1980 | Chambers | 363/54 |
| 4,238,811 | 12/1980 | Fry | 361/92 |
| 4,331,995 | 5/1982 | Voss | 361/85 |

Primary Examiner—Marc S. Hoff
Assistant Examiner—S. Jackson
Attorney, Agent, or Firm—Robert R. Keegan

[57] ABSTRACT

There is disclosed a monitoring apparatus for a multiphase electrical system of very simple and reliable circuit design capable of monitoring such a system and producing fault signals to operate protective relays and for visual indication. A main component of the apparatus is a multiphase, full-wave bridge rectifier circuit having matched voltage dropping input resistors so that the output of the bridge is a low voltage fluctuating DC signal such that neither the semiconductor diode rectifiers of the full-wave bridge or other internal components of the monitoring apparatus are exposed to high power line voltages. Phase unbalance in the apparatus is detected by evaluating the ratio of the peak to trough voltage of the fluctuating DC signal produced by the full-wave bridge. If the trough voltage drops below approximately 85% of the peak voltage, this is a very reliable indication of phase unbalance; the apparatus is adjustable to determine the magnitude of unbalance required to produce a fault signal and/or visual indication. The apparatus also incorporates high and low-voltage monitoring features utilizing some of the same signals produced by the full-wave bridge for phase monitoring purposes; any one of the monitoring features can cause a general fault signal, and operation of a protective device or individual visual indications may be provided to distinguish out of range voltage conditions and phase unbalance conditions.

19 Claims, 3 Drawing Sheets

THREE-PHASE UNBALANCE AND VOLTAGE MONITOR CIRCUIT

BACKGROUND OF THE INVENTION

The performance of three-phase or other multiphase electrical apparatus, motors in particular, is adversely affected when there is an unbalance between the voltages supplied by the respective phases of the multiphase system, even though the average of the phase-voltage is well within the acceptable range of supply voltage for the equipment. Of course, abnormally high-voltage or abnormally low-voltage on all phases is also potentially detrimental to electrical equipment. In particular, phase unbalance is detrimental when it persists for long periods of time because it can lead to overheating of a particular phase winding of a motor or the like resulting in a cumulative deterioration and shortened life or even catastrophic failure. Apparatus for monitoring multiphase electrical systems to detect phase unbalance or high or low-voltage conditions and to provide false signals to operate protective relays or visual or audible indicators have long been well known. Typically such monitor apparatus has been bulky with numerous expensive components or failed to achieve optimum reliability and avoid shutdown or false warning from relatively innocuous transient conditions.

SUMMARY OF THE INVENTION

The present invention provides very simple, yet reliable and accurate, phase-voltage monitoring apparatus for a three-phase electrical system of the type commonly used in industrial and commercial environments. The apparatus of the invention is capable of being modified for use with poly-phase systems with more than three phases, but the three-phase system is by far the most common. Certain three-phase electrical apparatus needs to be protected against the imposition of improper voltages to the apparatus. One naturally wants to protect against very high average voltages and very low average voltages outside of the specifications for which the motor or other apparatus is designed. Phase balance is another condition particularly important with respect to three-phase motors and certain other three-phase apparatus which involves the relationship between the voltages of the conductor pairs of the three-phase electrical supply system. Ideally the sinusoidal voltage difference for each of the conductor pairs should be the same so that the maximum voltage difference between any two of the three conductors would be the same as for any two others. While voltage is normally measured as RMS (root mean square) voltage in electrical power systems, for simplicity and clarity the following explanation is in terms of peak or instantaneous voltage values, unless otherwise stated.

The phase balance between the three-phase conductors is a matter of greater concern because the measurement is not as simple as the total peak, RMS, or average voltage measurement, and a persistent phase unbalance, even of a small amount, can produce overheating of motor windings or other conditions degrading the motor and reducing its longevity. It is, therefore, desirable to be able to detect phase-voltage unbalance on the order of only a few percent rather than having a tolerance of ten percent or more before a fault indication as was provided by most relatively inexact apparatus of the prior art.

The apparatus of the present invention includes a three-phase bridge rectifier, preferably a full-wave rectifier, which also serves as a voltage divider by reason of the matched input resistors in the three input paths. The full-wave rectified output of the three-phase bridge rectifier is connected to appear across a load resistor which also is preferably a precision resistor. The load resistor has a substantially lower resistance by a factor of ten or more relative to the input resistors. The voltage appearing across the load resistor is determined by selecting its resistance to produce a suitable voltage, such as 12 volts, for input to conventional semiconductor voltage comparator integrated circuits. The rectified voltage appearing across the load resistor is proportional to the instantaneous (absolute) value of the maximum voltage difference between any two of the three-phase system conductors. This is a fluctuating DC voltage having peaks which occur at six times the frequency of the alternating current frequency of the three-phase system. The circuit according to the invention analyzes the fluctuating DC voltage by measuring the peaks and troughs to evaluate whatever degree of phase unbalance may be present.

The apparatus according to the invention can provide fault signals to operate protective relays for motors or other devices and can also produce signals for visual or audible indicators. These signals output from the device may, if desired, provide separate and distinct indications of phase unbalance, high-voltage, or low-voltage. Furthermore, the threshold for producing a fault signal or indication may be individually set for each of the three conditions being monitored.

The apparatus according to the invention analyzes the fluctuating DC full-wave rectified voltage across the load resistor by comparison with an independent constant voltage reference that is not dependent upon the three-phase supply voltage. The circuit also includes a peak detector circuit and means for deriving a predetermined fraction of the peak voltage for comparison with the instantaneous voltage thereby sensing the presence of a trough voltage less than the predetermined fraction of the peak voltage. A protective relay is provided in the circuit together with a time delay circuit for causing the protective relay to be operated only upon persistence of a fault condition beyond a few cycles of the alternating current signal.

In addition to providing the above-described features and advantages, it is an object of the present invention to provide a voltage monitoring system for a multiphase electrical system which is operable with a three wire (Delta) electrical system and provides separate signals for indicating improper voltage or phase unbalance.

It is another object of the present invention to provide a voltage monitoring system for a multiphase electrical system which analyzes a fluctuating DC full-wave rectified voltage derived from the voltages of the three conductors of the system and is capable of detecting and indicating a high-voltage or a low-voltage condition in the absence of phase unbalance or is capable of detecting and indicating a condition of phase unbalance in the absence of low-voltage or high-voltage.

It is still another object of the present invention to provide simple, inexpensive apparatus without multiphase transformers or high-voltage rectifiers for accurately monitoring phase-voltage conditions in an industrial electrical system with voltages of 400 volts or higher.

BRIEF DESCRIPTION OF THE DRAWINGS

Other objects and advantages will be apparent from consideration of the following description in conjunction with the appended drawings in which.

DETAILED DESCRIPTION OF THE PREFERRED EMBODIMENTS

Figure 1:
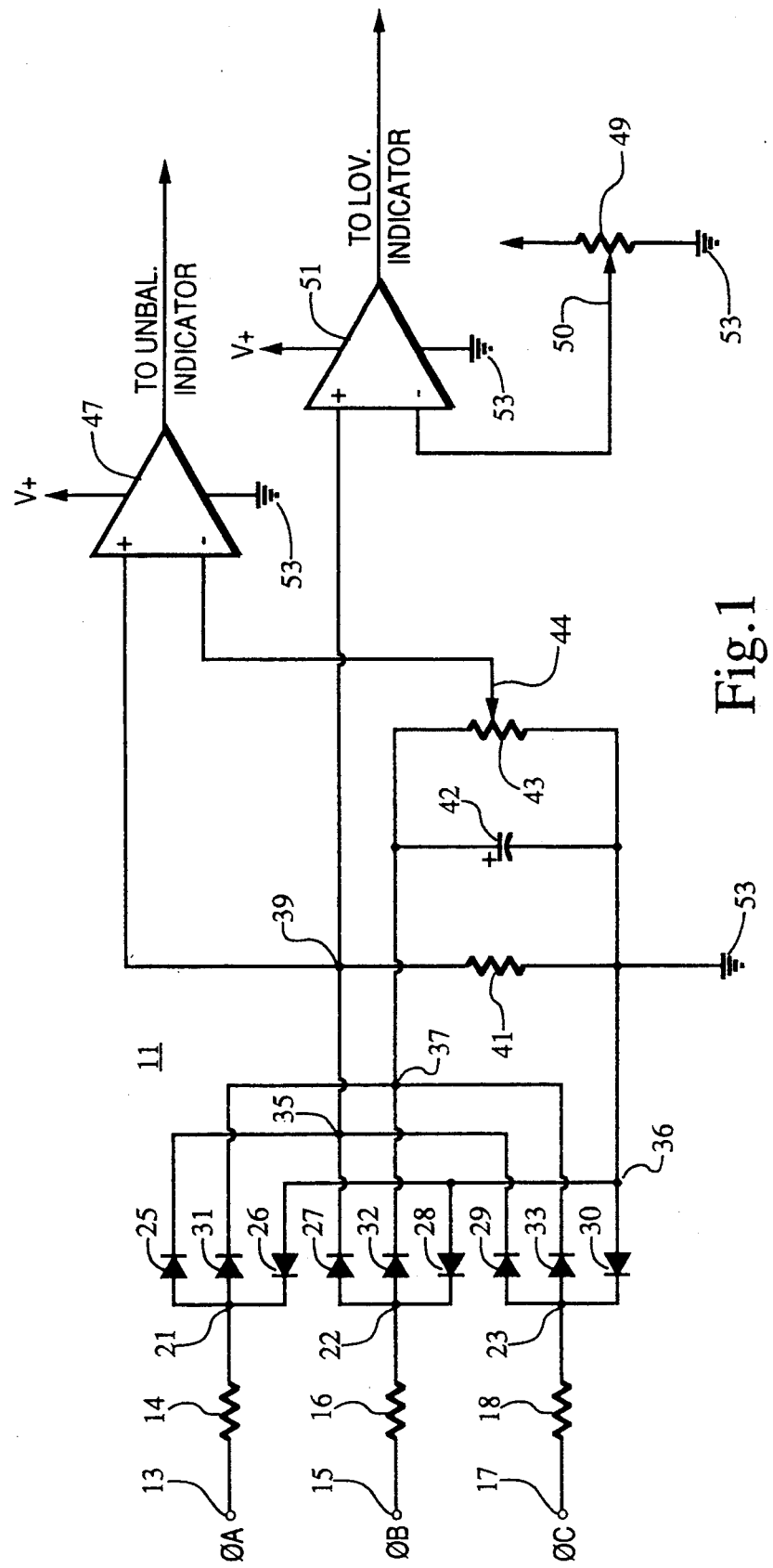
FIG. 1 is a schematic circuit diagram showing a basic phase and voltage monitoring apparatus according to the invention.

Referring to FIG. 1 a phase-voltage monitoring system 11 is shown having terminals 13, 15, and 17 adapted to be connected to the three conductors of a three phase electrical system. For the purpose of explanation, it will be assumed that the system is a delta-connected system with only three conductors and without a fourth neutral conductor, although the apparatus of the invention is not limited to use with such delta-connected systems. It should also be noted that the apparatus of the invention could be adapted to monitor electrical systems having more than three phases although by far the most common multiphase system is a three-phase system.

Each of the terminals 13, 15, and 17 is connected to respective junctions 21, 22, and 23 by respective resistors 14, 16, and 18. Preferably resistors 14, 16, and 18 are high precision resistors and, more particularly, the electrical resistances of resistors 14, 16, and 18 are matched within a tolerance of no more than about 1%.

Semiconductor diodes 25, 26, 27, 28, 29, and 30 are connected in pairs to the junctions 21, 22, and 23 to form a full-wave three phase bridge circuit. The high-voltage output of the bridge circuit appears at junction 35, and also at junction 39, and the low-voltage output thereof appears at junction 36. Accordingly, the output wave form of the bridge circuit comprising diodes 25, 26, 27, 28, 29, and 30 is impressed upon resistor 41. The low-voltage end of resistor 41 which is connected to junction 36 is also connected to ground 53. It should be pointed out that ground 53 is not at the same potential as the electrically neutral ground for the three-phase electrical system being monitored, but rather ground 53 is merely an electrical ground, or common connection, within the phase-voltage monitoring circuit itself.

It is desired to generate a second high-voltage full-wave rectified signal for the circuit of FIG. 1, and this is accomplished by diodes 31, 32, and 33 which have an output at junction 37 which is impressed across resistor 43. Due to the action of capacitor 42 the voltage across resistor 43 is approximately the peak voltage of the bridge circuit output. On the other hand, the voltage appearing at junction 39 is the instantaneous voltage output of the bridge circuit. The use of additional diodes 31, 32, and 33 provide isolation and prevent interaction between the voltage across resistor 41 and the voltage across resistor 43. Resistor 43 is configured as a potentiometer with a movable contact 44.

The voltage across resistor 41, and some fixed but adjustable portion of the voltage appearing across resistor 43, are provided to the inputs of an operational amplifier 47 utilized as a comparator. Amplifier 47 will provided an output indicating phase unbalance if the voltage across resistor 41 is less than the selected portion of the voltage across resistor 43.

Figure 2:
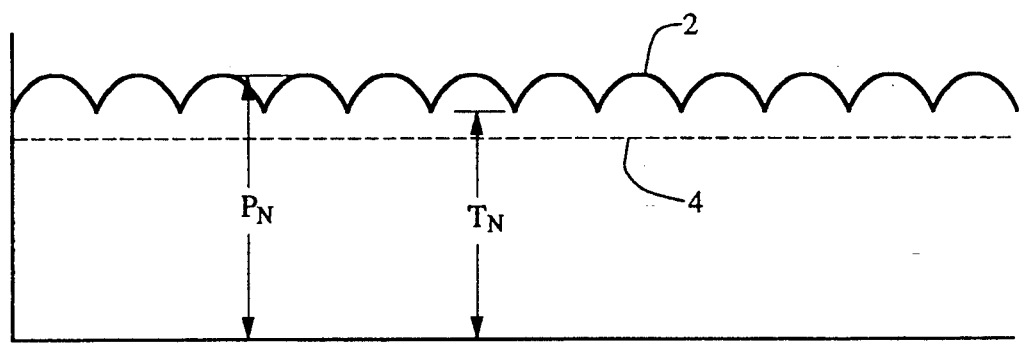
FIG. 2 and FIG. 3 are wave form diagrams illustrating internal signal wave forms in the apparatus in normal and phase unbalance conditions.
Figure 3:
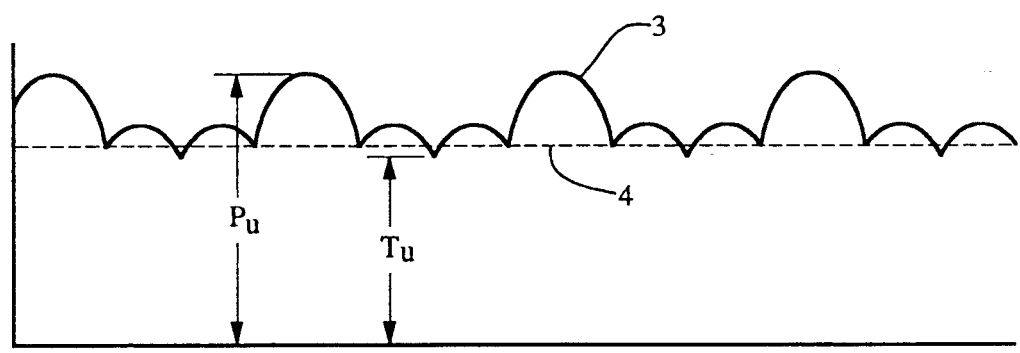

Referring to FIGS. 2 and 3 and particularly to FIG. 2, it will be seen that the instantaneous output voltage of the full-wave rectifier circuit appearing at junction 39 and shown as wave form 2 in FIG. 2 represents a voltage substantially proportional to the absolute value of the instantaneous voltage difference between the highest voltage of any of terminals 13, 15, or 17 and the lowest voltage of any of those terminals.

In FIG. 2 the dashed line 4 indicates the voltage at movable contact or slider 44 in FIG. 1 which is a fixed but adjustable fraction of the voltage indicated at $P_n$ representing the voltage appearing across resistor 43 as a whole. Voltage $T_n$ indicated in FIG. 2 is the lowest voltage at any instant for the wave form 2 under conditions of phase balance as indicated in FIG. 2.

Assuming phase balance and sinusoidal wave forms in FIG. 2, it can be calculated that $T_n$ is little more than 85% of $P_n$. In the circuit of FIG. 1 there may be factors such as diode forward voltage drop and other factors which will cause the actual relation between $T_n$ and $P_n$ to depart from the theoretical relationship. This, however, is not a serious problem because one may simply calibrate the relationship between the position of movable contact 44 and the phase unbalance necessary to cause an output from amplifier 47. While it is desirable for resistors 41 and 43 to be precision resistors, lack of precision could be accommodated by calibration of the circuit. The important factor is that resistors 14, 16, and 18 be closely matched in resistance to avoid any false indication of phase unbalance.

Before explaining the other portion of the circuit of FIG. 1 which has to do with low-voltage indication, it is useful to discuss the advantages of the phase-voltage monitoring circuit of FIG. 1 relative to prior apparatus used for this purpose.

In a delta-connected system (a three wire system) there is no common point against which the three phase-voltages can individually be referenced. While it would be possible to convert the delta-connected system voltage to a wye-connected arrangement by use of a transformer or the like, this is the sort of complication which the present invention seeks to avoid.

The system of the present invention takes advantage of the fact that, as shown in FIG. 2, the wave form of a full-wave rectified signal in a three-phase circuit has peaks and troughs $P_n$ and $T_n$ that will have a proportional relationship that is subject to little or no variation in a balanced phase situation. On the other hand, in an unbalanced phase situation as illustrated in FIG. 3, the highest peaks $P_u$ are proportionately much higher than the lowest troughs $T_u$. The phase monitor circuit according to the invention responds to the greater difference proportionately between $P_u$ and $T_u$ in FIG. 3 as compared with the difference between $P_n$ and $T_n$ in FIG. 2. This contrasts with commonly used previous phase monitoring apparatus which sought to detect phase unbalance by the difference in heights of the peaks and successive peaks in the wave form of FIG. 3 for example. Utilizing the present invention it is possible to detect very small unbalances of only a few percent between the phases of a multiphase circuit without actually comparing the peaks associated with one phase to the peaks associated with a different phase. This can be carried out according to the invention in a circuit in which the signal voltages analyzed are on the order of 12 volts or less and without the expense and complications of transformers or similar bulky and expensive circuit components. An important factor in simplification of the circuit of FIG. 1 is the use of resistors 14, 16, and 18 in the input which have a relatively high resistance value compared to resistors 41 and 43 thereby reducing the voltage to which the diodes are exposed. The resistance of resistors 14, 16, and 18, may be from ten times to a hundred times as great as the resistance of resistor 41 or resistor 43, with the result that diodes 25, 26, 27, 28, 29, 30, 31, 32, 33, may have a low maximum voltage rating of 50 volts or less, notwithstanding the fact that terminals 13, 15, and 17 are connected to monitor electrical supply voltages of hundreds or even thousands of volts. It should be pointed out that there is a forward voltage drop across the diodes of FIG. 1 of somewhat less than 1 volt which is a minor source of inaccuracy. However, this can be compensated for and does not represent a serious source of inaccuracy in the operation of the phase-voltage monitor. This source of inaccuracy is eliminated in a preferred form of apparatus shown in FIG. 5.

Included in the apparatus of FIG. 1 is a low-voltage detection circuit including an operational amplifier 51 operating as a comparator to compare the voltage across resistor 41 with a selected portion of the voltage across a resistor 49 having a movable contact or slider 50. Resistor 49 is connected between ground 53 and a source of regulated positive DC voltage. The DC voltage for resistor 49 and also for operational amplifiers 47 and 51 is not affected by changes in voltage at terminals 13, 15, and 17 and, if desired, may be totally independent with a backup rechargeable battery.

It will be noted that while amplifier 47 served to generate a phase-voltage unbalance indication, amplifier 51 functions to indicate a low instantaneous voltage level even in the presence of balanced phase-voltages. The reason for this difference in indications is that the voltage derived from resistor 43 is affected by the maximum peak voltage of the phases of the multiphase electrical system, being a pre-determined selectable portion thereof. On the other hand, the voltage derived from resistor 49 is independent of the voltages at terminals 13, 15, and 17 being monitored by the system. Thus, the system illustrated in FIG. 1 is capable of producing a signal indicating unbalance of phases, a signal indicating low-voltage, or a signal indicating both phase unbalance and low-voltage.

Figure 4:
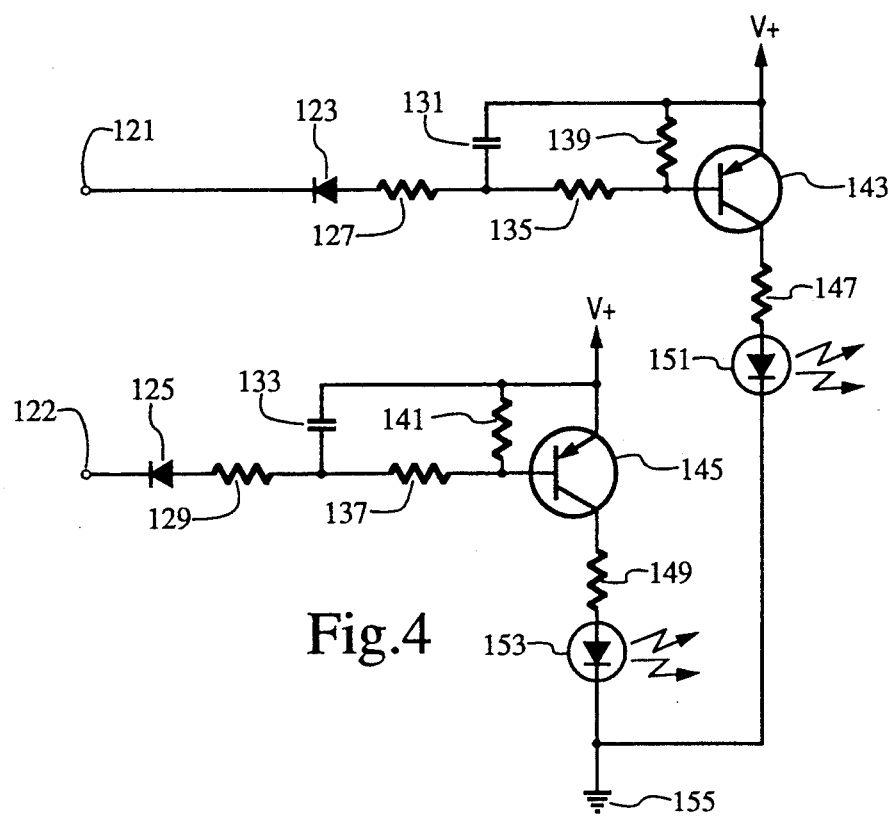
FIG. 4 is a schematic circuit diagram of an indicator circuit suitable for use with a phase-voltage monitoring circuit such as that illustrated in FIG. 1.

Utilization of the signals from amplifier 47 and amplifier 51 in FIG. 1 can be implemented by any of many known audio or visual indicating circuits or devices and an exemplary circuit for this purpose is shown in FIG. 4. Input 121 is connected to receive the signal from amplifier 47 and input 122 is connected to receive the signal from amplifier 51. The circuit connected to input 121 comprises a diode 123 in series with a resistor 127 and a resistor 135 connected to the base of a transistor 143. The emitter of transistor 143 is connected to a positive DC voltage source and also connected through resistor 139 to the base of transistor 143; a capacitor 131 is connected from the junction of resistors 127 and 135 to the collector of transistor 143 and provides a time delay function whereby noise or transients in the monitored system will not cause an indication of a fault. The resistance and capacitance values in the circuit of FIG. 4 may, according to known techniques in the art, be selected to provide a delay of from one cycle (one-sixtieth of a second) to about one second before transistor 143 turns on in response to repeated unbalance indications at input 121; a representative value for the delay would be one-half second.

When transistor 143 turns on, current through resistor 147 and light emitting diode 151 causes a visual indication to be produced by light emitting diode 151.

In a similar fashion, light emitting diode 153 produces an indication in response to repeated low-voltage signal reception at input 122. The function of the low-voltage indicator circuit is implemented in a similar manner to the phase unbalance indicator portion of the circuit wherein diode 125 corresponds to diode 123; resistors 129, 137, 141, and 149 correspond to resistors 127, 135, 139, and 147; capacitor 133 corresponds to capacitor 131; light emitting diode 153 corresponds to light emitting diode 151; and transistor 145 corresponds to transistor 143. Time delay for turn-on of transistor 145 may be different than that for transistor 143 if desired.

The circuit arrangement of FIG. 1 is subject to numerous variations. For example, a high-voltage indicator could be added to the circuit using another adjustable voltage reference and an operational amplifier connected in an opposite fashion to produce a fault signal for peak voltages above such adjustable voltage reference level. If desired, amplifier 51 could be omitted in FIG. 1 and resistor 49 could be connected along with suitable isolating diodes to the same input of amplifier 47 as the voltage from resistor 43 selected by slider 44. This would provide a single fault signal rather than separate signals for low-voltage and phase unbalance.

Figure 5:
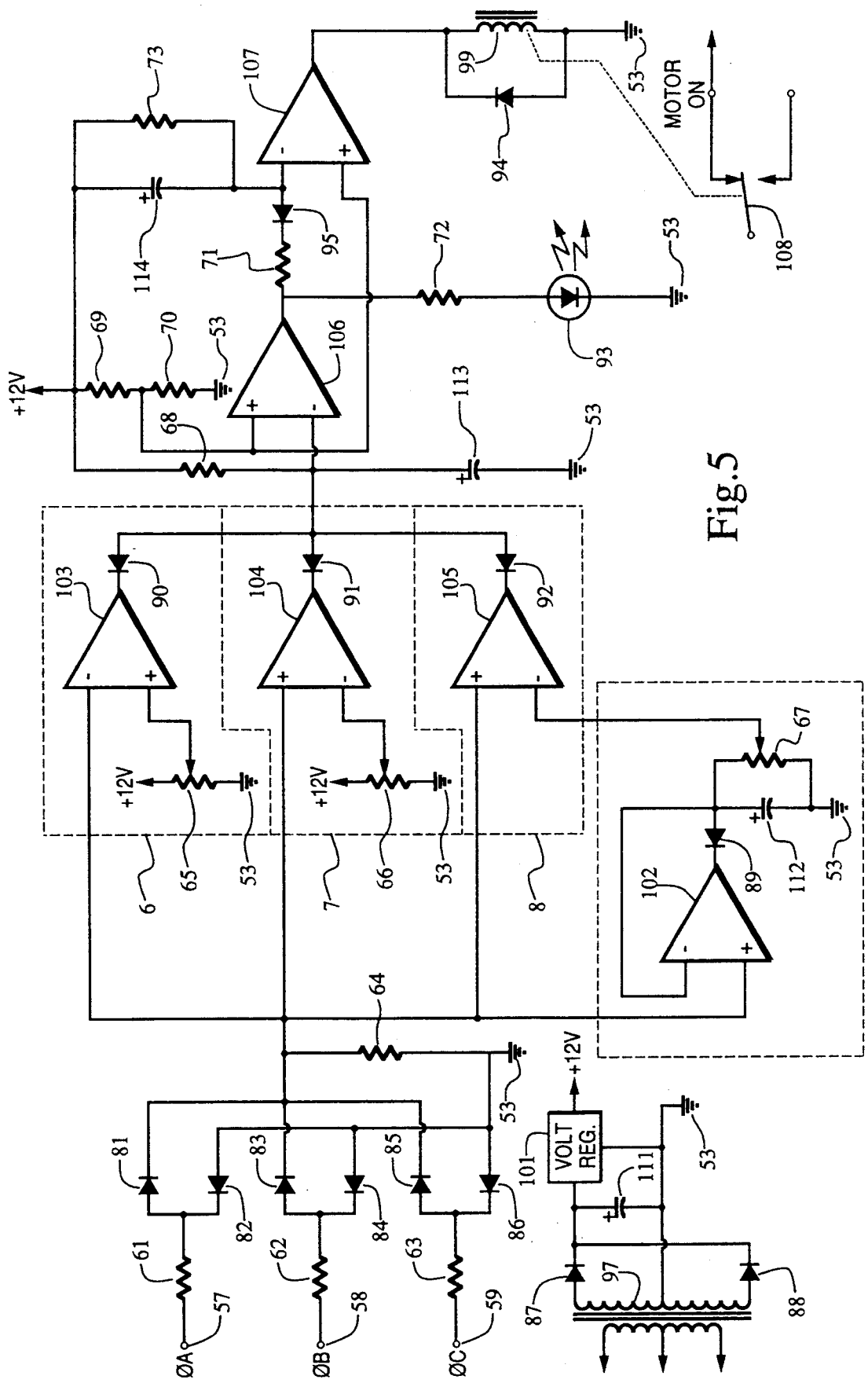
FIG. 5 is a schematic circuit diagram of an alternative preferred form of phase-voltage monitoring circuit according to the invention.

A preferred embodiment of a three-phase balance and voltage monitor circuit having further optional features is shown in FIG. 5. As with the system of FIG. 1, the system of FIG. 5 may be used with a three wire or delta-connected multiphase power system. Terminals 57, 58, and 59 are connected to respective conductors of a three-phase system with the terminals 57, 58, and 59 connected through precision resistors 61, 62, and 63 to a conventional three phase full wave rectifier circuit including semiconductor diodes 81, 82, 83, 84, 85, and 86.

The full-wave rectified output from the diodes having a wave form substantially the same as that shown in FIG. 2 or FIG. 3 is connected across a resistors 64 which also is a precision resistor having a resistance much less than the matched resistances of resistors 61, 62, and 63.

The voltage appearing across resistor 64 provides an input signal for comparator circuits 6, 7, and 8 shown in dashed line boxes in FIG. 5 which have respective amplifiers 103, 104, and 105, each receiving such signal and acting as difference amplifiers. The signal from resistor 64 is connected to the negative or low input of amplifier 103 and is connected to the positive or high input of amplifier 104 and of amplifier 105.

Comparator 6 and amplifier 103 serve as a high-voltage detector while comparator 7 and amplifier 104 serve as a low-voltage detector. Amplifier 104 operates in a manner similar to amplifier 51 in FIG. 1 with resistor 66 being a counterpart of resistor 49. Because of the reversal of connections to amplifier 103 compared to amplifier 104, amplifier 130 of comparator 6 produces a fault signal when the signal from resistor 64 exceeds the voltage setting of resistor 65. The comments with respect to ground 53 made with respect to FIG. 1 are also applicable to the circuit of FIG. 5.

An amplifier 105 in FIG. 5 acts as the counterpart of amplifier 47 in FIG. 1 and serves to produce a fault signal in the presence of substantial unbalance in the voltages of the multiphase system.

A peak voltage signal is required for amplifier 105 as it was for amplifier 47. An amplifier 103 together with semiconductor diode 89 and an appropriate feedback path for amplifier 102 produces both a buffering function and a rectifying function which substantially eliminates the effect of forward voltage drop of diode 89. The buffer or isolation effect of amplifier 102 eliminates the necessity for more than six diodes in the bridge circuit so that there is no counterpart in FIG. 5 of diodes 31, 32, and 33 in FIG. 1. Resistor 67 performs the function of resistor 43 and capacitor 112 performs the function of capacitor 42.

The phase-voltage balance monitor function of comparator 8 and amplifier 105 of FIG. 5 is substantially the same as that described for the apparatus of FIG. 1.

It is desired that a false signal from any one or more of the comparators 6, 7, or 8 be transmitted for further utilization and this is assured by the isolation function of semiconductor diodes 90, 91, and 92. As illustrated in FIG. 5, one fault signal from any of the three comparators 6, 7, and 8 indicates at least one fault condition without distinction as to whether it is produced by low-voltage, high-voltage or phase-voltage unbalance. Clearly, the outputs of amplifiers 103, 104, and 105 as shown in FIG. 5 could be provided to separate indicators rather than being combined.

An amplifier 106 is connected as a level detector with one input of amplifier 106 connected to receive the output from comparators 6, 7, and 8 while the other input receives a fixed voltage from the junction of the resistors 69 and 70 forming a voltage divider. Resistor 68 and capacitor 113 convert the fault signals in the form of pulses to a steady signal output from amplifier 106 as long as the fault continues. The output of amplifier 106 is supplied through a resistor 72 to a light emitting diode 93 and to ground 53. Light emitting diode 93 in FIG. 5 operates without delay in response to a fault signal in contract to the delayed operation of light emitting diodes 151 and 153 in FIG. 4.

It is essential, or at least desirable, that any motor control relays operated by the phase-voltage monitor circuit have a delay in their operation, however, and this function is provided in FIG. 5 by an amplifier 107 and its associated components. One input to amplifier 107 is connected to the voltage divider represented by resistors 69 and 70 while the other input is connected through a resistor 71 and a semiconductor diode 95 to receive the output from amplifier 106.

A parallel resistance-capacitance circuit is formed by resistor 73 and capacitor 114 and is connected from the DC power supply to the active input of amplifier 107. The resulting time delay for output of amplifier 107 is about one-half second.

The output of amplifier 107 is supplied to the coil of a relay 99 which operates a switch 108 to open the circuit to the motor in the presence of a sustained fault condition. A semiconductor diode 94 suppresses reactive current spikes from coil 99. It should be understood that the circuitry including amplifier 106, amplifier 107, relay 99 and the associated components is exemplary only and may be replaced by other conventional or known circuits for processing and utilizing the fault signals generated by the phase unbalance and voltage monitor circuitry.

As previously mentioned, the power supply for such circuits is preferable independent of power from the three-phase system being monitored. A power supply shown in FIG. 5 may be utilized to provide regulated DC voltage or may alternatively be utilized to charge a rechargeable battery in the event that uninterruptable power is desired to operate relay 99 and the other portions of the circuit. The power supply of FIG. 5 includes a transformer 97 together with rectifier diodes 87 and 88, a filter capacitor 111 and a conventional voltage regulator 101.

If desired the small transformer used in the 12 volt DC power supply may have dual primaries; this will allow it to be connected with primaries in series to any two conductors of the three-phase line or with primaries in parallel. It can be powered from a 120 voltage single phase line. The power supply illustrated for the circuit of FIG. 5 is exemplary only and any one of numerous forms of conventional power supplies with or without rechargeable batteries for backup could be employed. It is desirable that the nominal voltage output of transformer 97 be substantially higher than the 12 volt (for example) regulated voltage output so that the circuit will be fully operative even for abnormally low-voltage conditions at the primary of transformer 97.

Although the values for resistors and other components of the FIG. 5 circuit are subject to considerable variation, exemplary values are shown below.

TABLE I

| | Resistors | |
|---|---|---|
| 61–63 | 267 K | ±1% Metal Film ¼ Watt |
| 64 | 13 K | ±1% Metal Film ¼ Watt |
| 65, 66 | 25 K | Potentiometer |
| 67 | 250 K | Potentiometer |
| 68 | 1000 K | ¼ Watt ± 5% Carbon Film |
| 69, 70 | 20 K | ¼ Watt ± 5% Carbon Film |
| 71 | 10 K | ¼ Watt ± 5% Carbon Film |
| 72 | 1 K | ¼ Watt ± 5% Carbon Film |
| 73 | 820 K | ¼ Watt ± 5% Carbon Film |
| | Capacitors (Microfarads) | |
| 111 | 100 (35 V) | Aluminum electrolytic |
| 112 | 4.7 (35 V) | Low-leakage Al electrolytic |
| 113 | .068 | Polyester film |
| 114 | 1.0 (50 v) | Low-leakage Al electrolytic |
| | Diodes | |
| 81–86 | | IN914 (or IN4148) |
| 89–92 | | IN914 (or IN4148) |
| 95 | | IN914 (or IN4148) |
| 93 | | Red L.E.D. (Lumex SSL-LX5093ID) |
| 87, 88, 94 | | IN4007 |
| | Integrated Circuits | |
| 101 | | AN78L12 12 V 100 mA Voltage Regulator (Panasonic) |
| 102–105 | | Sections of Quad LM324 op amp. (National) |
| 106, 107 | | Sections of Dual LM358 op amp. (National) |
| | Transformer | |
| 97 | | Signal Transformer Co. Part No. DST-2-28 |
| | Relay | |
| 99 | | Potter & Br4umfield T75S5D112-12 (S.P.D.T.-12 VOC) |

In addition to the variations and modifications to the invention that have been shown, described or suggested, other variations or modifications will be apparent to those skilled in the art, and, accordingly, the scope of the invention is not to be considered limited to those embodiments described or suggested but is rather to be determined by reference to the appended claims.

I claim:

1. Multiphase electrical system phase-voltage monitoring apparatus comprising:
   at least three input terminals for connection of conductors for at least three respective phases of an electrical system to be monitored;
   respective input resistors of substantially equal resistance each having a one end connected to a respective one of said at least three input terminals;
   a multiphase full-wavebridge rectifier circuit having at least three inputs, said inputs being connected to ends of respective ones of said input resistors opposite said at least three input terminals, said bridge rectifier circuit having an output voltage substantially proportional to the absolute value of the instantaneous voltage difference between the highest voltage of any of said terminals and the lowest voltage of any of said terminals;
   means for producing a reference voltage, which voltage is greater than one-half but less than seven-eighths of the normal maximum output voltage of said bridge rectifier circuit; and
   means for comparing said output voltage and said reference voltage and producing a fault signal when the instantaneous value of said output voltage falls below the value of said reference voltage;
   whereby a phase unbalance condition is analyzed by comparison of bridge rectifier fluctuating D. C. instantaneous voltage minimums with a voltage reference equal to a predetermined fraction of normal maximum output peak voltage of the bridge rectifier.

2. Apparatus as recited in claim 1 wherein said means for producing a reference voltage comprises means for producing a voltage equal to a predetermined fraction of the short term averaged maximum of said bridge rectifier circuit output voltage.

3. Apparatus as recited in claim 1 wherein said means for producing a reference voltage comprises an adjustable source of constant DC voltage.

4. Apparatus as recited in claim 1 wherein said bridge rectifier circuit has an output resistor, current through which produces said output voltage, and wherein the resistance of said output resistor is less than one-tenth the resistance of each of said input resistors.

5. Apparatus as recited in claim 4 wherein said multiphase full-wave bridge circuit comprises three semiconductor diodes with their cathodes connected to respective ones of said input resistors and their anodes connected to a first end of said output resistor and further comprises fourth, fifth, and sixth semi-conductor diodes with their anodes connected to respective ones of said input resistors and their cathodes connected together and connected to the end of said output resistor opposite said first end of said output resistor.

6. Apparatus as recited in claim 5 wherein said means for comparing said output voltage and said reference voltage includes a voltage comparator circuit having the voltage across said output resistor connected to one of its inputs and said reference voltage connected to another of its inputs.

7. Apparatus as recited in claim 6 further including a time delay circuit connected to receive the output from said comparator circuit and adapted to produce a warning signal in response to a prolonged abnormal condition indicated by fault signals from said comparator circuit.

8. Apparatus as recited in claim 2 further including a time delay circuit connected to receive the output from said means for comparing said output voltage and said reference voltage and adapted to produce a warning signal in response to a prolonged abnormal condition indicated by fault signals from said means for comparing said output voltage and said reference voltage.

9. Apparatus as recited in claim 8 further including a time delay circuit connected to receive the output from said means for comparing said output voltage and said reference voltage and adapted to produce a warning signal in response to a prolonged abnormal condition indicated by fault signals from said means for comparing said output voltage and said reference voltage.

10. An electrical system voltage monitoring apparatus comprising:
    at least three input terminals for connection of conductors for at least three respective electrical phases to be monitored;
    respective conductive paths of substantially equal resistance each having a first end connected to a respective one of said at least three input terminals;
    a rectifier circuit having at least three inputs, each said input being connected to the end of a respective one of said conductive paths opposite to said first end, said rectifier circuit having means for producing an output signal with a value substantially proportional to the absolute value of the instantaneous voltage difference between the highest voltage of any of said terminals and the lowest voltage of any of said terminals;
    means for producing a reference signal greater than one-half but less than seven-eighths of the normal maximum value of said output signal; and
    means for comparing said output signal and said reference signal and producing a fault signal when the instantaneous value of said output signal falls below the value of said reference signal;
    whereby a phase unbalance condition is analyzed by comparison of bridge rectifier fluctuating D. C. instantaneous voltage minimums with a voltage reference equal to a predetermined fraction of normal maximum output peak voltage of the bridge rectifier.

11. Apparatus as recited in claim 10 wherein said means for producing a reference signal comprises means for producing a signal with a value equal to a predetermined fraction of the short term averaged maximum value of said bridge rectifier circuit output signal.

12. Apparatus as recited in claim 10 wherein said means for producing a reference signal comprises an adjustable source of a constant value signal.

13. Apparatus as recited in claim 10 wherein said rectifier circuit has an output resistor, current through which produces said output signal, and wherein the resistance of said output resistor is less than one-tenth the resistance of each of said conductive paths.

14. Apparatus as recited in claim 5 wherein said rectifier circuit comprises three semi-conductor diodes with their cathodes connected to respective ones of said conductive paths and their anodes connected to said output resistor.

15. Apparatus as recited in claim 10 further including a time delay circuit connected to receive the output from said means for comparing said output signal and said reference signal, said time delay circuit being adapted to produce a warning signal in response to a prolonged abnormal condition indicated by said comparator circuit.

16. Multiphase electrical system phase-voltage monitoring apparatus comprising:

at least three input terminals for connection of conductors for at least three respective phases of an electrical system to be monitored;

a multiphase full-wavebridge rectifier circuit having at least three inputs, said inputs being connected to respective ones of said at least three input terminals, said bridge rectifier circuit having an output substantially proportional to the instantaneous voltage difference between the highest voltage of any of said terminals and the lowest voltage of any of said terminals;

means for producing a reference voltage, which voltage is greater than one-half but less than eight-tenths of the maximum output voltage of said bridge rectifier circuit; and means for comparing said output voltage and said reference voltage and producing a fault signal when the absolute value of the instantaneous value of said output voltage falls below the value of said reference voltage;

whereby a phase unbalance condition is analyzed by comparison of bridge rectifier fluctuating D. C. instantaneous voltage minimums with a voltage reference equal to a predetermined fraction of normal maximum output peak voltage of the bridge rectifier.

17. Apparatus as recited in claim 16 wherein said bridge rectifier circuit has an output resistor with a first end and a second end, current through which produces said output voltage, and wherein said multiphase full-wave bridge circuit comprises at least three semi-conductor diodes with their cathodes connected to respective ones of said input terminals and their anodes connected together and connected to a first end of said output resistor and further comprises at least three further semi-conductor diodes with their anodes connected to respective ones of said input resistors and their cathodes connected together and connected to the end of said output resistor opposite said first end of said output resistor.

18. Apparatus as recited in claim 17 wherein said means for comparing said output voltage and said reference voltage includes a voltage comparator circuit having the voltage across said output resistor connected to one of its inputs and said reference voltage connected to another of its inputs.

19. Apparatus as recited in claim 18 further including a time delay circuit connected to receive the output from said comparator circuit and adapted to produce a warning signal in response to a prolonged abnormal condition indicated by said comparator circuit.

* * * * *